United States Patent
Hucker et al.

(10) Patent No.: US 10,633,901 B2
(45) Date of Patent: Apr. 28, 2020

(54) BRAKING DEVICE

(71) Applicant: GEZE GmbH, Leonberg (DE)

(72) Inventors: Matthias Hucker, Marxzell (DE);
André Sebastiaan Maria Jansen,
Roermond (NL)

(73) Assignee: Geze GmbH, Leonberg (DE)

( * ) Notice: Subject to any disclaimer, the term of this patent is extended or adjusted under 35 U.S.C. 154(b) by 0 days.

(21) Appl. No.: 15/890,092

(22) Filed: Feb. 6, 2018

(65) Prior Publication Data

US 2018/0223576 A1 Aug. 9, 2018

(30) Foreign Application Priority Data

Feb. 8, 2017 (DE) .................... 10 2017 201 944

(51) Int. Cl.
*H02M 7/00* (2006.01)
*F25D 23/02* (2006.01)
*E05F 15/60* (2015.01)
*H02H 3/00* (2006.01)
*H02P 29/024* (2016.01)
*E05F 3/00* (2006.01)
(Continued)

(52) U.S. Cl.
CPC .............. *E05F 3/00* (2013.01); *E05F 15/603* (2015.01); *H02P 3/12* (2013.01); *H02P 29/027* (2013.01); *H02P 29/0241* (2016.02); *E05Y 2201/21* (2013.01); *E05Y 2201/434* (2013.01); *E05Y 2400/616* (2013.01); *E05Y 2900/132* (2013.01)

(58) Field of Classification Search
CPC ....... H02M 7/003; F25D 23/021; E05F 15/60;
E05F 15/603; H02H 3/006; E05Y
2201/21; H02P 29/027
See application file for complete search history.

(56) References Cited

U.S. PATENT DOCUMENTS 5,341,077 A * 8/1994 Chen .................... H02H 7/0833
318/434
6,194,856 B1 * 2/2001 Kobayashi ............ H02M 7/003
318/432
(Continued)

FOREIGN PATENT DOCUMENTS

AT 504808 A2 8/2008
DE 10254608 B4 12/2010
(Continued)

*Primary Examiner* — Cortez M Cook
(74) *Attorney, Agent, or Firm* — Steven M. Shape;
Dennemeyer & Associates, LLC

(57) ABSTRACT

A braking device for a movable door wing comprising an electric motor operated as a generator wherein its motor shaft is rotatable by a movement of the door wing and which outputs a motion-dependent motor voltage, and a braking circuit to which the motor voltage is applied or can be applied and via which the electric motor can be short-circuited in order to dampen a movement of the door wing. In addition, it is provided that the braking device comprises a safety device with a current sensor which is designed to detect amperage generated by the electric motor. The safety device is designed to modify the braking circuit depending on the detected amperage in such a way that upon reaching or exceeding a predetermined or predeterminable overload amperage, the current in the braking circuit is reduced.

13 Claims, 1 Drawing Sheet

(51) Int. Cl.
*H02P 3/12* (2006.01)
*E05F 15/603* (2015.01)

(56) References Cited

U.S. PATENT DOCUMENTS

| | | | |
|---|---|---|---|
| 2010/0236281 A1* | 9/2010 | Eom | F25D 23/021 |
| | | | 62/449 |
| 2011/0185941 A1* | 8/2011 | Gonzalez Fernandez | ................... |
| | | | B61D 19/026 |
| | | | 105/341 |
| 2012/0299520 A1* | 11/2012 | Krupke | E05F 15/60 |
| | | | 318/473 |
| 2015/0115852 A1* | 4/2015 | Lee | H02H 3/006 |
| | | | 318/400.22 |

FOREIGN PATENT DOCUMENTS

| DE | 102012110271 A1 | 4/2014 |
|---|---|---|
| DE | 102015200284 B4 | 10/2015 |

* cited by examiner

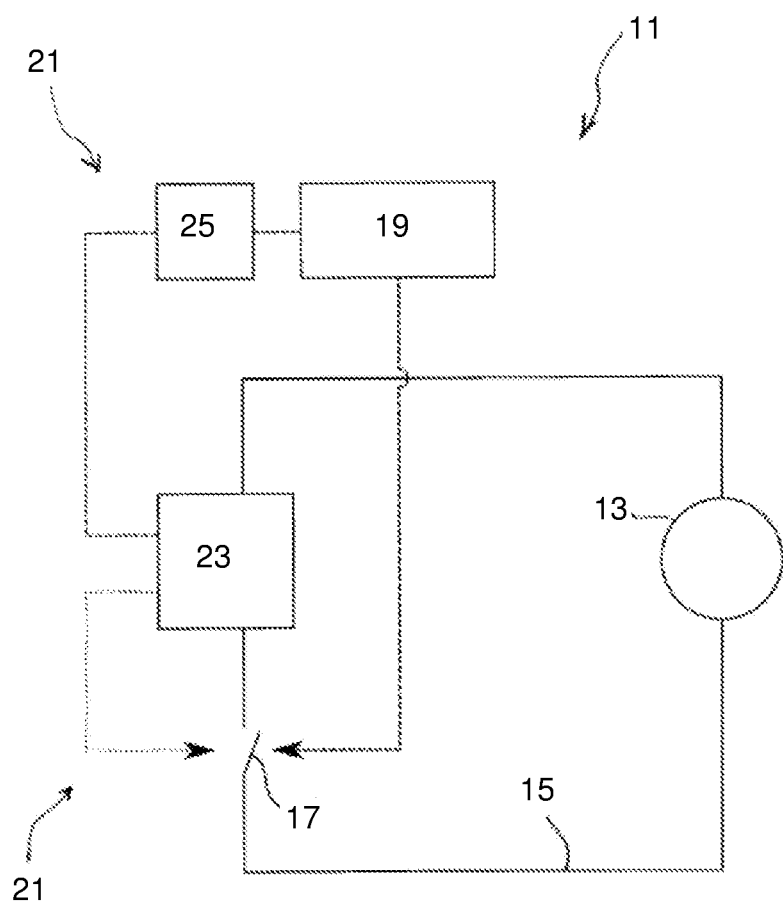

BRAKING DEVICE

The present invention relates to a braking device for a movable door wing.

Door closers for movable door wings with mechanical energy accumulator and a braking device are known from the prior art. When opening the door, the mechanical energy accumulator is charged with potential energy, which closes the released door wing again. The mechanical energy accumulator is designed, for example, as a spring, which is tensioned by opening of the door wing. After that, the potential energy in the spring closes the door. The closing moment of the door wing is determined by the current spring tension and the various translations in the system. The closing speed itself is damped in the braking device, for example, by oil in a damper. The desired closing properties can be adjusted by way of a variety of hydraulic valves and their settings. This allows for a cost effective and self-sufficient implementation of the door closer, i.e the door closer works without external energy supply.

However, the closing speed of the door wing with valves is only adjustable to a certain extent. So, for example, the end-impact function always has the same point of application, because only the passage is adjustable and not the position of the valve. Furthermore, functions that depend on the current speed of the door leaf can only be implemented cumbersomely. In addition, controlling the closing speed, for example, to a desired closing time of the door wing, is difficult to implement. The valves must be adjusted accordingly by trial and error. If the temperature of the damper oil or the friction conditions in the door closer change, the closing time changes accordingly. In addition, escaping damper oil can lead to pollution of the environment if the door closer develops a leak and the damper oil then has to be disposed of. Furthermore, oil from the damper is usually flammable, which could leak in the event of fire and then could contribute to the spreading of a fire.

In order to avoid such disadvantages, the braking device may comprise an electric motor operated as a generator wherein its motor shaft is rotatable by a movement of the door wing and which outputs a motion-dependent motor voltage, and a braking circuit to which the motor voltage is applied or can be applied and via which the electric motor can be short-circuited in order to dampen a movement of the door wing. The damping is not carried out by the fact that damper oil is forced through valves, but in the fact that the electric motor operated as a generator generates electrical energy that is consumed by the short-circuiting. Such a braking device may also be provided in a non-electrically operated door closer, as in principle no current source is required for the operation of the braking device. In this manner, even a braking device, equipped with an electric motor, which is generator-driven and which can be short-circuited, can enable an autonomous implementation of the door closer. Depending on the construction, the braking device, particularly the mentioned braking circuit, can also feature switching elements, which require a power supply in order to be actuated. In addition, the braking device may be provided in an electric door drive, wherein the electric motor can then also serve as a motor of the door drive in addition to its function as a generator of the braking device, for which power must then be supplied.

A door drive for actuating a movable door wing with such a braking device is known from DE 10 2005 028 007 B4. The braking circuit of this brake device has a switching element designed as a field-effect transistor, via which the motor terminals of the electric motor can be short-circuited. A drain-source path of the field effect transistor is arranged in the braking circuit and a voltage between the gate and source of the field effect transistor is adjusted via a potentiometer, which is arranged in parallel with the drain-source path of the field effect transistor. A voltage tap of the potentiometer is connected to the gate terminal of the field effect transistor. As such, the field effect transistor is operated as a voltage-dependent load resistance for the electric motor, so that the braking force of the braking device is dependent on the output voltage of the electric motor operated as a generator and is also adjustable via the potentiometer.

A similar braking device is known from DE 10 2015 200 284 B3. This braking device has an evaluation and control unit, which performs a pulse width modulation of the motor current via a switching element in the braking circuit and in this way adjusts an effective braking force for damping the movement of the door wing. Doing so, the desired closing characteristics can be set in a way that is particularly flexible. The pulse width modulation of the motor current caused by the evaluation and control unit can be predetermined in many ways and in particular, it can be dependent by states detectable by sensors as well, e.g. depending on the current closing speed or the angular position of the door wing, so that regulation of the closing speed in order to achieve desired closing properties is possible.

As a rule, the braking device is designed with a view towards proper use of the respective door wing, e.g. with regard to forces as required for the normal opening or closing of the door wing, and/or when used with a door closer with regard to its spring force. However, even greater forces may be exerted on the door wing, as a result of wind, vandalism or by the fact that children play with the door. Such possible additional forces not only burden the mechanics of a particular door closer or door drive, but they can also impair the respective braking device.

Hydraulically damped door closers can be built into the hydraulic circuit as a protection from damaging hydraulic valves which open in the event of overloading and thereby release the movement of the door. Braking devices, where the damping of the movement of the door wing is based on the short-circuiting of a generator-powered electric motor cannot be protected by simple valves, and are therefore at risk of damage due to overloading. When excessive force is applied to the door wing, resulting in high door wing speed, a high motor voltage may be generated on the generator-operated electric motor of the braking device so that correspondingly high currents flow when short circuiting the electric motor. The high voltages and/or currents, however, can destroy components of the braking device, so that the braking device can become inoperative. In addition, excessive force with simultaneous damping causes the mechanism between the braking device and the door wing to be heavily stressed and this is something that can also lead to damage.

The purpose of the invention is to provide a braking device of the type mentioned, which features an improved safety against overloading.

This purpose is achieved by a braking device comprising the features of claim 1. Advantageous embodiments of the invention result from the dependent claims, the present description and the drawings.

The braking device in accordance with the invention comprises a safety device with a current sensor which is designed to detect amperage generated by the electric motor. The safety device is designed to modify the braking circuit depending on the detected amperage in such a way that upon reaching or exceeding a predetermined or predeterminable overload amperage, the current in the braking circuit is reduced.

The safety device can thus protect the rest of the brake device, especially against excessive current levels in the braking circuit. Through this, the electric motor can also be protected simultaneously against excessive currents via the braking circuit. The safety device intervenes in the braking circuit in such a way, that the current is reduced in the braking circuit. As a result, the damping acting on the door is particularly reduced so that the movement of the door is released in the event of excessive force in a similar manner to that in the event of an overload valve of a hydraulic door closer or so that the damping of the door eases to such an extent that the load of the braking device does not exceed a tolerable level.

The reduction of the damping not only protects the braking device itself, but also the mechanism between the braking device and the door wing, for example the motor gear of a door closer or of a door drive, as part of which the braking device is provided. Therefore, the intervention of the protection device does not necessarily need to be designed with regard to avoiding damage to the braking device. Rather, the intervention by the protection device can then be initiated when the braking device itself does not yet pose any overload, but when the mechanism reaches the limits of its load-bearing capacity.

As criterion for that reason, as to whether an intervention in the braking circuit is required, is to draw upon a current generated by the electric motor. This can be achieved directly by measuring the current itself or indirectly, e.g. by measuring a voltage from which the current can be derived, wherein this sensing of the current takes place by means of a current sensor of the safety device. In doing so, the current sensor can, in principle, be placed at any point of the braking device, where it can reliably determine an overload.

The sensing of the current does not necessarily have to take place at a point at which the current is at its highest or where an excessive current would most likely lead to damage. To determine an overload, it may be sufficient to detect a current at one point, which may be unproblematic at this point, but which allows the conclusion to be drawn that there is current at another point, which causes an overload there of the brake device.

Preferably, the current sensor is designed to detect the current in the braking circuit. For example, this has the advantage, that no current sensor has to be provided on the electric motor and therefore the electric motor also does not need to be designed in a special way.

The reduction of the current is triggered at least then when the aforementioned overload current is reached or exceeded. This overload current strength can be permanently specified in the braking device, because it can be defined in advance for each braking device by the components used in this braking device and their respective load capacity. However, the overload current strength can advantageously be predetermined at least once, so that it can be adapted to the respective door wing or to a mechanism of the door closer or the door drive, e.g. after the installation of a door closer or a door drive which has the braking device.

In order to protect the braking device and/or a mechanism on the door from overloading, the damping for example, can only be reduced in such a way that the highest possible damping is maintained where there is still no overload. Under certain circumstances, however, it can be preferable, especially as a precaution, if the safety device is designed to modify the braking circuit as a function of the detected current intensity in such a way, that the current flow in the braking circuit is interrupted when a predetermined or predeterminable overload current intensity is reached or exceeded. Such an interruption of the current flow completely cancels the short circuit via the braking circuit, so that also the damping of the door wing is suspended and the movement of the wing is thereby released.

As a general rule, the aforementioned current sensor of the safety device can be of a very simple design, and for example comprise a shunt resistor or a coil. However, by measuring the current via such an element, the circuit in which the current measurement takes place can be influenced. However, the current sensor should preferably detect the current without thereby changing the usual functionality of the braking circuit. Therefore, the current sensor is preferably designed to be free of feedback so that the current intensity in the braking circuit is not impaired by the detection of the amperage by way of the current sensor.

According to a preferred embodiment, this can be achieved in that the current sensor comprises a Hall effect sensor. In particular, the current sensor can be designed as a Hall effect sensor. Such a design has the advantage that the current intensity of the current flowing through the Hall effect sensor can be detected via the Hall effect voltage generated at the Hall effect sensor, which substantially, can take place without feedback to the current flow itself. Thus, a comparatively simple feedback-free detection of the current is possible.

According to an advantageous embodiment, the braking circuit comprises a switching element that is switchable by means of an evaluation and control unit by means of which the electric motor is short-circuited depending on the switching state of the switching element. Such a switching element allows for a simple but flexible control of the short circuit. The switching of a switching element not only makes it possible to simply switch on the damping as required but also to switch it off. It is also possible to set a—mean—damping intensity, in particular by switching the switching element to pulse-width modulation. By adjusting the relationship between the pulse duration of the short circuit and the duration of the interruption of the short circuit, the desired damping properties can be achieved in a flexible manner.

In such an embodiment, where a switching element of the braking circuit can be switched by means of the evaluation and control unit, the current sensor is also advantageously designed for this purpose, namely to output a load signal which is dependent on the detected amperage to the evaluation and control unit. The evaluation and control unit is then advantageously designed for this purpose, namely to switch the switching element in response to the load signal in such a way that through this, the current in the braking circuit is reduced.

The evaluation and control unit can, in particular, comprise a microcontroller which can receive the load signal from the current sensor and switch the respective switching element of the braking circuit. The use of a microcontroller enables a particularly variable determination of the relationship between the respectively detected amperage and of the influence of the damping in response to the detected current.

According to an advantageous development, the evaluation and control unit is designed to switch the switching element, when the detected amperage underlying the load signal reaches or exceeds the overload current, in such a way, that the current flow in the braking circuit is interrupted. Therefore, the damping is thus completely suspended by the evaluation and control unit when an overload threatens. In this way, the braking device and/or a mechanism between the braking device and the door wing is protected in a particularly reliable way.

In accordance with an alternative development, the evaluation and control unit is designed to switch the switching element when the detected amperage underlying the load signal reaches or exceeds the overload amperage in such a way that the amperage in the braking circuit is limited to a maximum current intensity on the overload current, preferably by means of pulse width modulation. In this way, the damping is not completely suspended, but merely reduced and at least not to such an extent that the current does not exceed a maximum amperage. This can be done particularly in the sense of regulation, so that the amperage is maintained, at least substantially at the maximum amperage. This has the advantage that the damping can be kept at a comparatively high value, but at the same time the braking device and/or the mechanism between the braking device and the door wing is conserved.

In particular, the maximum amperage can correspond to the overload current strength. However, it can also be intended in the design that an overload current strength is defined when the damping is reached or exceeded so that the damping is reduced, but that then the current is reduced to another, especially lower, maximum current strength, so that between the maximum current and the overload, there is a kind of buffer, through which protection against overload can be improved.

In particular, when the reduction and/or controlling of the amperage is achieved by means of a pulse-width modulation, then with the aforementioned amperage an effective current strength can be meant respectively, which can be defined as a sliding time average over the pulsed amperage.

According to a further advantageous embodiment, the current sensor is designed for this purpose as the aforementioned load signal to output a value proportional to the detected current intensity to the evaluation and control unit. Compared to the detected current intensity, the output value can for example, be amplified. Or, for example, it is outputted to a voltage proportional to the current. Such a load signal can in principle continuously assume different values and is in in particular analogue. An evaluation as to whether, in response to a respective load signal output by the current sensor, a reduction of the current in the braking circuit should be carried out, can actually be achieved in such an embodiment outside of the current sensor, e.g. in the aforementioned evaluation and control unit.

In contrast, in accordance with an alternative embodiment, it can be provided that the current sensor is designed for this purpose to compare the detected amperage with the overload amperage and to output a specific overload signal as the aforementioned load signal when the detected amperage reaches or exceeds the overload amperage and otherwise, to output a specific normal signal. In this respect, the current sensor outputs a binary load signal, which can only assume two different states and/or values, namely the overload signal or the normal signal. The overload amperage which, when reaching or exceeding the reduction of the amperage is triggered in the braking circuit, s then present preferably directly in the current sensor as a parameterisation, so that in the current sensor, a kind of evaluation can be done by comparing the detected current with the overload amperage Such an embodiment makes it possible to dispense with a separate evaluation and control unit, in principle, provided that it is not intended for the braking circuit anyway. This is because a switching element of the braking circuit, can, for example, be switched directly via the load signal sent out by the current sensor between a closed state in which the braking circuit is closed for short circuiting the electric motor, and an open state in which the short circuit is interrupted via the braking circuit. Inasmuch as, and in each such case, the evaluation and control unit can also be regarded as integrated into the current sensor.

According to such a further advantageous embodiment, it is therefore provided that the braking circuit comprises a switchable switching element, via which the electric motor is short-circuited depending on the switching state of the switching element, and in that the current sensor is designed to compare the detected current intensity with the overload current intensity and to switch the switching element into an open state when the detected current has reached or exceeded the overload current intensity, and to otherwise switch the switching element to a closed state.

Preferably, the aforementioned overload current intensity is adjustable in each case. For example, the overload amperage can be predefined, but adjustable, to the current sensor and/or the aforementioned evaluation and control unit as parameterisation. This enables adaptation of this parameter e.g. to different versions of a particular door closer or door drive, as well as to different types of stop modes. Most conveniently, the overload current level can be adjusted if it is radio-based, e.g. changeable via NFC.

According to a further advantageous embodiment, the electric motor is designed as a brushless electric motor with a plurality of stator coils, in each of which an alternating voltage is induced as a function of the movement of the door wing. By means of the current sensor, it is then possible to directly detect the current in a single stator coil. This can be sufficient as a criterion as to whether an overload of the brake device and/or a mechanism between the braking device and the door is present or not. In particular, it is therefore not absolutely necessary to detect the amperage in all stator coils and/or in the braking circuit.

In such an embodiment, the electric motor may in particular have at least one contact pair on which it outputs one of the alternating voltages induced in the stator coils, while the braking circuit comprises a partial braking circuit to which the alternating voltage output at the contact pair is applied or applicable and via which the contact pair can be short-circuited. The safety device is then advantageously designed for this purpose to modify the partial braking circuit as a function of the detected amperage in such a way that when the overload amperage is reached or exceeded, the amperage in the partial braking circuit is reduced. Because, when the electric motor as a whole is not short-circuited by means of a uniform braking circuit for the damping of the door wing, but individual stator coils are short-circuited via a respective other partial braking circuit, it may be purposeful to protect the partial braking circuits separately against overloading.

If the electric motor has a plurality of contact pairs, particularly a contact pair for each respective stator coil, at which, in each case one contact pair at which it outputs in each case a different one of the AC voltages induced in the stator coils, and the braking circuit comprises a plurality of partial braking circuits, at which in each case, a different one of the AC voltages which had been outputted at the contact pairs are applied or can be applied and by means of which the respective contact pair can be short-circuited, it is furthermore preferred, if the protection device is designed for this purpose to modify the partial-braking circuits in such a way namely as a function of the detected current intensity so that when the overload amperage is reached or exceeded, the current in all partial-braking circuits is reduced. This is because, in principle, each of the partial-braking circuits is at risk of being damaged by overloading independent of the other partial-braking circuits, so that it is advantageous to reduce the current in all partial-braking circuits in the case of a detected overload.

In the embodiments above, in which individual stator coils can be short-circuited via respective partial braking circuits, it may in principle be sufficient to detect the current directly in one of the stator coils. Alternatively or in addition, however, the amperage can also be detected in at least one partial braking circuit. A particularly comprehensive monitoring of the presence of an overload can be achieved specifically by designing the current sensor for this specific purpose namely to be able to detect the current intensity in all partial braking circuits of the braking circuit. For this purpose, a separate individual current sensor can be provided on each partial braking circuit, so that the mentioned current sensor is designed as an arrangement of a plurality of single-current sensors.

With reference to the illustration, the invention will be explained below by way of examples only.

BRIEF DESCRIPTION OF THE DRAWINGS

FIG. 1 illustrated an embodiment of a braking device 11 according to the invention in a schematic representation as a simplified circuit diagram.

The braking device 11 comprises an electric motor 13 whose motor shaft is coupled in such a manner to a door wing that movement of the door wing results in rotation of the motor shaft. The electric motor is thereby operated as a generator and outputs a motor voltage.

The motor voltage is applied to a braking circuit 15 of the braking device 11, via which the electric motor 13 is short-circuited. By short-cutting the electric motor 13, electrical energy is converted into heat, so that energy is extracted from the movement of the door wing, resulting in a damping of the movement. In particular, the strength of the damping depends on the short-circuit current in the braking circuit 15.

The short circuit is activated by the closing of a switching element 17. On the other hand, the flow of current through the braking circuit 15 is interrupted when the switching element 17 is open. In order to be in a position to set at least an average current flow in the braking circuit and subsequently, to be able to change the strength of the damping, an evaluation and control unit 19 is provided, which switches the switching element 17 in a suitable manner using pulse-width modulation to achieve predetermined desired damping properties. As a result of the pulse width modulation, the switching element 17 is alternately closed for a certain pulse duration and opened for a certain pulse pause duration. Due to the variable relationship between the pulse duration and the pulse pause duration, a mean current flow is then achieved by the braking circuit 15, which causes a certain damping of the door wing.

The switching of the switching element 17 by means of the evaluation and control unit 19 is symbolised in the FIGURE by the arrow which connects the evaluation and control unit 19 with the switching element 17. In the embodiment shown, the evaluation and control unit 19 is designed as a microcontroller. In addition to the illustrated elements, the evaluation and control unit 19 can also be connected to other elements, e.g. in order to detect a speed and/or a direction of movement of the door wing, so that direction-dependent damping and/or generally, a regulation of the damping becomes possible, taking into account external parameters.

In order to protect against excessive loading of the braking device 11 and/or a mechanism connecting the braking device 11 with the door, the braking device 11 features a safety device 21. This safety device 21 comprises a current sensor 23, which is arranged in the braking circuit 15. In order to detect amperage in the braking circuit 15, the current sensor 23 has a Hall effect sensor, which makes it possible to detect the amperage in the braking circuit 15, without thereby impairing the function of the braking circuit.

The amperage detected by the current sensor 23 is outputted to the evaluation and control unit 19 by the current sensor 23 as a load signal in the form corresponding to one of the detected current intensities, especially proportional to the detected amperage value. The output of the measured value to the evaluation and control unit 19 takes place via an amplifier 25, which adapts the load signal to an input sensitivity of the evaluation and control unit 19.

In this manner, the evaluation and control unit 19 can take into account the detected amperage during the activation of the switching element 17. In particular, the evaluation and control unit 19 compares the recorded amperage with the overload amperage which can be predetermined for the evaluation and control unit 19 and which is stored in the evaluation and control unit 19. If the recorded amperage reaches or exceeds the overload current intensity, the evaluation and control unit 19 switches the switching element 17 in such a way that the amperage in the braking circuit 15 is reduced in such a way that the damping of the door wing is consequently reduced. For this purpose, the evaluation and control unit 19 adjusts the pulse width modulation in such a way that the amperage in the braking circuit falls to a value below the overload amperage. As such, the braking device 11 and the mechanism between the brake device 11 and the door are protected from an excessive load.

In this embodiment, the evaluation and control unit 19, which is provided in any case in order to realise desired damping properties by means of pulse width modulation in the braking device 11 and at the same time, is a functional part of the safety device 21. The course of the signal through this safety device 21, which also includes the current sensor 23 and the amplifier 25, in addition to the evaluation and control unit 19, is shown in the FIGURE by broken lines.

However, the FIGURE also shows an alternative embodiment which is shown superimposed over the embodiment described above and where the course of the embodiment's signal is represented by a dotted line. The safety device 21' of this alternative embodiment only comprises the current sensor 23, which in this embodiment, is designed to compare the recorded amperage with the predetermined or predeterminable overload current amperage. The overload amperage can be stored for this purpose as parameterisation in the current sensor 23 and in particular, it can be changeable from the outside. For comparing the detected amperage with the overload amperage, the current sensor 23 may include, for example, a comparator in addition to a Hall effect sensor.

In such a safety device 21', the current sensor 23 can directly control the switching element 17 as shown. This is symbolised in the FIGURE by the arrow connecting the current sensor 23 to the switching element 17. In particular, the current sensor 23 can in this case be designed to open the switching element 17 when the detected current strength reaches or exceeds the overload current intensity. Achieving or exceeding the overload amperage then leads to a complete interruption of the current flow in the brake circuit, so that the damping of the door wing is paused. In this embodiment, therefore, a distinction is merely made as to whether an overload is imminent or not, and the braking circuit is possibly simply interrupted.

Thus, while a safety device 21, in which a continuously variable load signal is output to the evaluation and control unit 19 and then a pulse width modulation of the switching element 17 is adjusted in response to the load signal, the damping in the overload case can at least be maintained at a reduced rate. In the alternative safety device 21', its current sensor 23 only distinguishes between the presence and the absence of overload and the switching element 17 directly opens or closes accordingly and no such flexible adjustment of the damping is possible. However, this alternative embodiment has the advantage of a simpler structure. In this case, both embodiments share the common fact that they each improve the safety of the braking device 11, since in each instance an imminent overload is reacted to in a manner through which damage to the braking device 11 and/or the mechanism acting between the brake device 11 and the door wing due to an overload can be prevented by reducing the current in the braking circuit.

REFERENCE NUMERALS

11 Braking device
13 Electric motor
15 Braking circuit
17 Switching element
19 Evaluation and control unit
21, 21' Safety device
23 Current sensor
25 Amplifier

The invention claimed is:

1. A braking device (11) for a movable door wing, comprising:
an electric motor (13) operated as a generator, the electric motor including a motor shaft rotatable by a movement of the door wing and which outputs a motion-dependent motor voltage; and
a braking circuit (15) to which the motor voltage is applied or can be applied and via which the electric motor (13) can be short-circuited in order to dampen a movement of the door wing, wherein the braking device (11) comprises:
a safety device (21) with a current sensor (23) to detect a current intensity generated by the electric motor (13);
a switchable switching element (17); and
an evaluation and control unit (19) configured to switch the switching element via which the electric motor (13) is short-circuited, depending on a switching status of the switching element (17), wherein the current sensor (23) is configured to output a load signal dependent on a detected amperage to the evaluation and control unit (19), and the evaluation and control unit (19) is configured to switch the switching element (17) when the detected amperage underlying the load signal reaches or exceeds an overload amperage such that an amperage in the braking circuit (15) is limited to a maximum current intensity on an overload current.

2. The braking device according to claim 1, wherein the current sensor (23) is configured to detect the current in the braking circuit (15).

3. The braking device according to claim 1, wherein the safety device (21) is configured to modify the braking circuit (15) depending on the detected amperage in such a way that upon reaching or exceeding the overload amperage, the current in the braking circuit (15) is interrupted.

4. The braking device according to claim 1, wherein the current sensor (23) is configured to be free of feedback such that the current intensity in the braking circuit (15) is not impaired by the detection of the amperage by the current sensor (23).

5. The braking device according to claim 1, wherein the current sensor (23) comprises a Hall effect sensor.

6. The braking device according to claim 1, wherein the evaluation and control unit (19) is configured to switch the switching element (17), when the detected amperage underlying the load signal reaches or exceeds the overload current such that the current flow in the braking circuit (15) is interrupted.

7. The braking device according to claim 1, wherein the current sensor (23) is configured to output a value proportional to the detected current to the evaluation and control unit (19).

8. The braking device according to claim 1, wherein the current sensor (23) is configured to compare the detected amperage with the overload amperage and to output a specific overload signal if the detected amperage reaches or exceeds the overload amperage and otherwise, to output a specific normal signal.

9. The braking device according to claim 1, wherein the braking circuit (15) comprises a switchable switching element (17) via which the electric motor (13) is short circuited, depending on a switching status of the switching element (17), and the current sensor (23) is configured to compare the detected amperage with the overload amperage and to switch the switching element (17) to an open state when the detected amperage reaches or exceeds the overload amperage and otherwise, to switch the switching element (17) to a closed state.

10. The braking device according to claim 1, wherein the overload amperage is adjustable.

11. A braking device (11) for a movable door wing, comprising:
an electric motor (13) configured as a brushless electric motor with a plurality of stator coils, in each of which an alternating voltage is induced as a function of a movement of the door wing, the electric motor (13) having at least one contact pair on which the electric motor (13) outputs one of the alternating voltages induced in the stator coils, the electric motor operated as a generator, the electric motor including a motor shaft rotatable by a movement of the door wing and which outputs a motion-dependent motor voltage; and
a braking circuit (15) comprising a partial braking circuit to which the alternating voltage output at the contact pair is applied or can be applied and by means of which the contact pair can be short-circuited in order to dampen a movement of the door wing, wherein the braking device (11) comprises a safety device (21) with a current sensor (23) to detect a current intensity generated by the electric motor (13), and the safety device (21) is configured to modify the partial braking circuit as a function of the detected amperage such that the amperage in the partial braking circuit is reduced when the overload amperage is reached or exceeded.

12. The braking device according to claim 11, wherein the electric motor (13) has a contact pair for each stator coil, at which the electric motor (13) outputs another of the alternating voltages induced in the stator coils, the braking circuit (15) comprises a plurality of partial braking circuits, at which the braking circuit (15) outputs another of the alternating voltages at the contact pairs being applied or applicable, and by which the respective contact pair can be short-circuited, and the safety device (21) is configured to modify the partial braking circuit as a function of the detected amperage such that the amperage in the partial braking circuit is reduced when the overload amperage is reached or exceeded in all partial current circuits.

13. The braking device according to claim 11, wherein the current sensor (23) is configured to detect the amperage in at least one partial braking circuit of the braking circuit (15).

\* \* \* \* \*